No. 655,624. Patented Aug. 7, 1900.
C. H. HARTMAN.
BEARING FOR CAR TRUCKS.
(Application filed June 4, 1900.)
(No Model.)
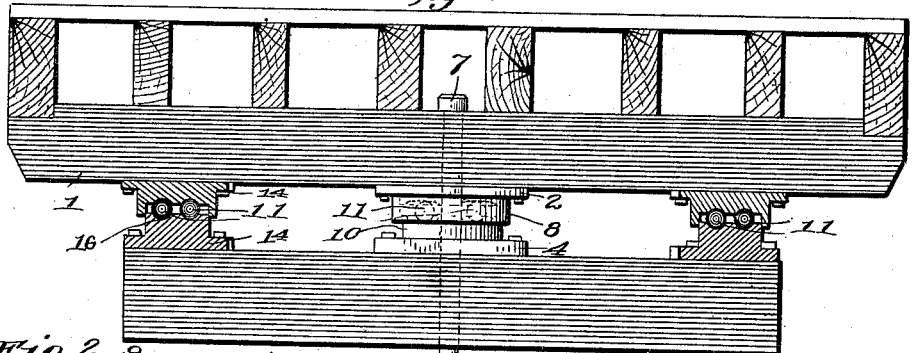
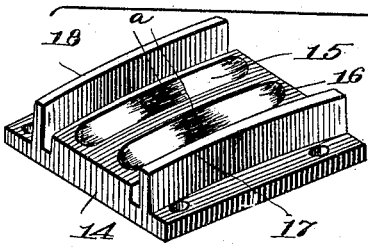 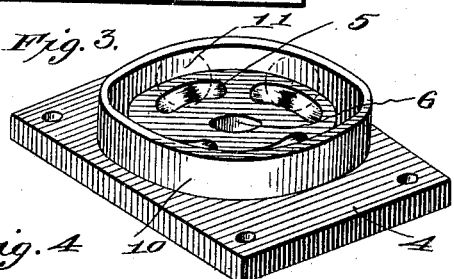
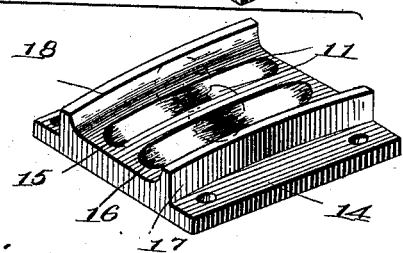 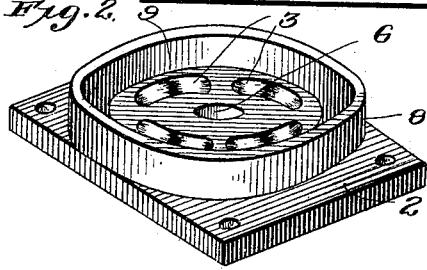
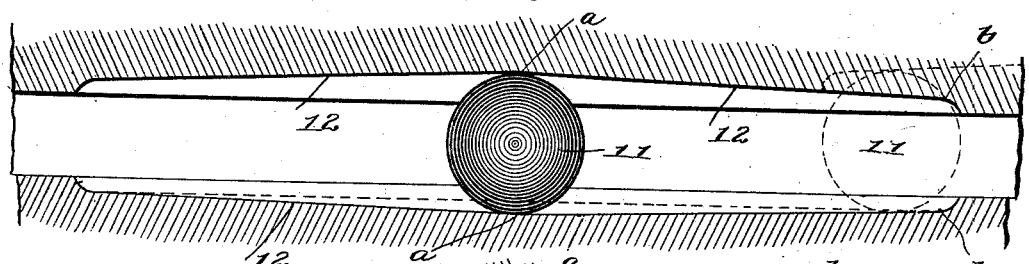
Witnesses
Inventor
Charles H. Hartman
By James L. Norris
Atty.

UNITED STATES PATENT OFFICE.

CHARLES H. HARTMAN, OF ALLEGHENY, PENNSYLVANIA.

BEARING FOR CAR-TRUCKS.

SPECIFICATION forming part of Letters Patent No. 655,624, dated August 7, 1900.

Application filed June 4, 1900. Serial No. 19,013. (No model.)

*To all whom it may concern:*

Be it known that I, CHARLES H. HARTMAN, a citizen of the United States, residing at Allegheny, in the county of Allegheny and State of Pennsylvania, have invented new and useful Improvements in Bearings for Car-Trucks, of which the following is a specification.

My invention relates to improvements in bearings for car-trucks, and has for its object to provide a novel construction, arrangement, and combination of parts in such bearings, whereby the friction is reduced to a minimum and whereby when the truck assumes an angular position with respect to the car-body, as in rounding curves in the track, the car-body is automatically lifted or elevated, and when the car has passed the curve in the track and enters upon a straight track thereof the car-body naturally resumes its normal relative position with respect to the truck with ease and smoothness and a minimum of friction, the weight of the car-body causing the balls to move back to the middle or deepest part of the ball-races, grooves, or pockets.

To this end the invention consists in the novel construction, combination, and arrangement of parts hereinafter described and claimed, reference being made to the accompanying drawings in which—

Figure 1 is a view of the middle or center bearing in elevation and showing a transverse sectional view of the side bearings. Fig. 2 is a detail perspective view of the upper member or plate of the middle bearing inverted. Fig. 3 is a similar view of the lower member or plate of the bearing, showing anti-friction-balls in operative position therein. Fig. 4 shows perspective views of the upper and lower side bearing members or plates with antifriction-balls seated in the lower member. Fig. 5 is a sectional view taken through one of the side bearings; and Fig. 6 is a sectional view taken through coincident ball-races, pockets, or grooves of the middle or center bearing on a slightly-exaggerated scale.

In the said drawings the reference-numeral 1 designates a portion of the car-body, on which the upper member or plate 2 of the middle or center bearing is mounted or secured in any suitable manner. As shown, it is provided in its bearing-face with a series of annularly-disposed and independent or separated ball-races, pockets, or grooves 3, which are segmental or struck on arcs of a circle and are substantially elliptical in shape. The lower member of the middle or center bearing consists of a plate 4, suitably mounted on or secured to the truck-bolster, and it is provided in its bearing-face with a series of annularly-disposed, independent, or separate ball-races, pockets, or grooves 5, which are struck on arcs of a circle and are of substantially-elliptical shape and are so arranged that when the two members or plates forming part of the bearing are in their proper relative position for operation they will register or coincide with the similar ball races, pockets, or grooves of the upper member or plate 2. Each of said plates 2 and 4 are provided with a central passage 6, through which the king-bolt 7 passes, said king-bolt engaging the car-body and the truck-bolster, as shown. Both of the said plates 2 and 4 have a rotary swiveling movement on the king-bolt, and, as will be seen, the upper plate 2 rotates on the lower plate.

The bearing is provided with a guard to exclude dust, cinders, and other foreign matter from the balls and ball-races, pockets, or grooves, consisting of a surrounding flange 8, projecting downwardly from the upper plate 4 and separated from the ball-pockets by an annular space 9, into which space a flange 10, projecting upward from the lower member or plate of the bearing, loosely fits, and the two flanges completely house and protect the balls and ball-races, pockets, or grooves from the entrance of dust, cinders, or other foreign matter which would render the bearing less efficient.

The numerals 11 indicate antifriction devices, such as balls or their equivalents, one such device being arranged in each pocket, race, or groove 5 of the lower member or plate 4 and a portion of each of which projects into the corresponding race, pocket, or groove 3 of the upper member or plate 2. In this way the balls are independent or held separate from each other, so that they will not rub or wear against each other. The grooves, pockets, or races present in transverse section a bearing-surface for the balls which conforms to the circumferential contour of the balls and in extent about equal to one-third of the circumference of the balls. This construction I consider of importance, as it provides bearing-surfaces for the balls in the upper and lower plates which aggregate substantially two-thirds of the circumference of the balls. This extended bearing-surface of the balls above and beneath insures that the latter will not cut into the metal of the upper and lower bearing-plates. Prior to my invention in such bearings where balls were employed it has been customary that the balls roll or bear upon the flat faces of the plates, the actual contacting surface being quite small and almost a point, and in such arrangements it has been found that the ball very quickly cuts into the metal of the plate and the ball itself loses its true spherical character, and consequently the bearing is inefficient and unsatisfactory.

As best shown in Fig. 6 of the drawings, the bottoms or faces 12 of the ball-races, pockets, or grooves both in the upper and lower members or plates of the bearing are deepest at the middle or center, as at $a$, and incline therefrom toward the ends, as at $b$, whereby there is provided a series of oppositely-inclined end faces or opposing inclines in the ball-races, pockets, or grooves, which serve when the truck assumes an angular position with respect to the car-body, as in rounding a curve in the track, to slightly lift or elevate the car-body by reason of the balls riding up or moving upon the inclined faces of the ball-races, pockets, or grooves. When the truck has passed a curve in the track and enters upon a straight tract thereof, the car naturally resumes its normal relative position with respect to the truck with ease and smoothness, the weight of the car-body causing the balls to move back to the middle or deepest part of the ball-races and assisting materially in the resumption of the normal relative position of the car body and truck.

The provision of the novel arrangement of bearing described also reduces to a minimum the friction of the bearing and enables the cars to run with great smoothness and less expenditure of power than heretofore necessary.

In the drawings I have shown the preferred form of side bearings to be used in connection with my improved middle or center bearing. Said side bearings consist of upper and lower plates 14, each provided with grooves, pockets, or ball-races 15 16, each race receiving one ball. At each side of the ball-races flanges 17 18 are provided on the bearing-plates to serve as dust-guards in a manner similar to the flanges described with relation to the middle or central bearing. The bottoms or runways of these ball-races 15 16 of the side bearings are deepest at the center and gradually incline to their extremities, as described, with relation to the ball-races of the center bearing, and they operate in connection with the contained balls in like manner. It will be noticed that the longitudinal extent of the ball-races of the side bearings is greater in the example shown in the drawings than that of the ball-races of the center bearing, and therefore the inclination from the centers thereof to the extremities is more gradual than in the ball-races of said center bearing.

The relative position of the upper and lower members of the center or middle bearing and a ball arranged in one of the ball-races or pockets when the car has been lifted, as described, is shown in dotted lines in Fig. 6 of the drawings, and in Fig. 5 is shown in dotted lines the relative position of the members of the side bearings and a ball contained in the raceway thereof when the car has been lifted as described.

The grooves, pockets, or ball-races of my improved bearing are substantially semicircular in cross-section, whereby there is provided ball rolling or running faces which correspond to the contour of the balls seated therein. This transverse configuration of the groove is important in that, as will appear, an extended running or bearing surface for the balls is provided, such bearing-surfaces being approximately one-third of the circumferential dimension of the balls. In contradistinction to flat bearing-plates, upon which the balls impinge or have bearing-contact at a substantially single point around the circumference and in which arrangement the balls are found to cut very rapidly into the metal or the plate and very rapidly wear and lose their true spherical character, and thus render the bearing inefficient, the improved ball-races described, provided in both the upper and lower plates of the bearing and in which the balls fit and have an extended bearing or running contact, constitute a distinct advantage and entirely obviate the difficulty referred to and add very materially to the life of the balls and the bearing-plates and to the efficiency of the bearing. The correlative improvement of having such grooves, ball-races, or pockets separate and independent, as shown, with a single ball in each thereof, whereby the balls are entirely independent and out of rubbing contact with each other, provides a bearing which is satisfactory, smooth in operation, which reduces friction, and adds materially to the life of the bearing.

The balls arranged in the several ball-races of the bearing, as shown, project in part into the ball-races of the lower members and in part into the ball-races of the upper members of the bearing.

Having thus described my invention, what I claim is—

1. A bearing comprising a truck center plate, a swiveled body center plate rotating thereon, and means for automatically elevating the body center plate when the truck center plate turns, substantially as described.

2. A bearing comprising upper and lower center plates designed to be mounted respectively on a car-body and a truck and both of said plates provided in their bearing-faces with pockets forming oppositely-inclined faces, and antifriction devices interposed between the center plates, arranged in the pockets and adapted to ride up the inclined faces of said upper and lower plates, substantially as described.

3. A bearing comprising upper and lower center plates designed to be mounted on a car-body and a truck, and provided in their bearing-faces with tapering elliptical pockets arranged in an annular series and forming inclined end faces, and antifriction devices interposed between the plates, arranged in the pockets and adapted to ride up the inclined faces, substantially as and for the purpose described.

4. In a middle or center bearing, the combination with upper and lower members provided with annular series of ball-races having opposing inclined faces, and balls arranged in said ball-races, substantially as described.

5. In a middle or center bearing, the combination with upper and lower members provided with an annular series of independent ball-races having opposing inclined faces, and independent balls arranged in said races, substantially as described.

6. In a bearing, the combination with upper and lower center plates, provided with annularly-arranged ball-races, of balls arranged in said races, and inclined faces coöperating with the balls for the purpose described.

7. In a bearing, the combination with upper and lower center plates, provided with annularly-arranged independent ball-races, of independent balls arranged in said races, and inclined faces coöperating with the balls for the purpose described.

8. In a bearing for cars, the combination of a middle or center bearing and side bearings, each composed of upper and lower plates and provided with ball-pockets having oppositely-inclined faces, and antifriction devices interposed between the upper and lower plates of said bearings, substantially as described.

9. In a car-bearing, the combination of middle and side bearings composed of upper and lower members and means for automatically elevating the car-body when the truck turns with relation to the car-body, substantially as described.

10. In a car-bearing, the combination of middle and side bearings composed of upper and lower members and means interposed between the upper and lower members of said bearings for automatically elevating the car-body when the truck turns with relation to the car-body, substantially as described.

11. A bearing comprising a body center plate, a truck center plate, ball-pockets in said plates, balls arranged in said pockets, and an inclined ball-running face for each of said balls, whereby the car-body is automatically elevated when the truck moves with relation to the car-body, substantially as described.

12. A car-truck bearing comprising upper and lower middle or center plates, each having a series of separated arc-shaped grooves and a series of balls, one resting in each groove of the lower plate, with a part of its circumference projecting into the corresponding groove of the upper plate, substantially as described.

13. A car-truck bearing comprising upper and lower plates, each having a series of individual separated pockets or grooves which are semicircular in cross-section, and a series of balls, a single ball resting in each pocket or groove of the lower plate and projecting into the corresponding groove or pocket of the upper plate, substantially as described.

14. A bearing comprising a truck center plate, a swiveled body center plate rotating thereon, and coöperating means interposed between said plates for automatically elevating the body center plate when the truck center plate turns, substantially as described.

In testimony whereof I have hereunto set my hand in presence of two subscribing witnesses.

C. H. HARTMAN.

Witnesses:
HARRY K. JOHNSTON,
H. S. LYDICK.